United States Patent [19]

Buerkley et al.

[11] 4,098,738

[45] Jul. 4, 1978

[54] IMAGE DEVELOPING MEANS

[75] Inventors: Donald D. Buerkley, Inver Grove Heights; Richard S. Law, Newport, both of Minn.

[73] Assignee: Minnesota Mining and Manufacturing Company, Saint Paul, Minn.

[21] Appl. No.: 689,841

[22] Filed: May 25, 1976

Related U.S. Application Data

[63] Continuation of Ser. No. 207,646, Dec. 13, 1971.

[51] Int. Cl.$^2$ ............................................. C08L 91/00
[52] U.S. Cl. ................... 260/28.5 AV; 106/21; 106/31; 260/23 H; 260/23 R; 260/27 R; 260/27 EV; 260/28.5 R; 260/28.5 A; 264/331; 428/411; 428/511
[58] Field of Search .................. 106/21, 31; 260/28.5 AV, 28.5 R, 28.5 A, 23 H, 23 R, 27 R, 27 E; 428/411, 511; 264/331

[56] References Cited

U.S. PATENT DOCUMENTS

| | | | |
|---|---|---|---|
| 3,492,258 | 1/1970 | Kremer | 260/28.5 AV |
| 3,627,546 | 12/1971 | Coppetta | 106/19 |
| 3,672,842 | 6/1972 | Florin | 106/19 |

*Primary Examiner*—Melvyn I. Marquis
*Attorney, Agent, or Firm*—Cruzan Alexander; Donald M. Sell; Warren R. Bovee

[57] ABSTRACT

The disclosed moldable compositions contain a metal salt which is a coreactant for, preferably, one of the conventional iron/polyhydric phenol image-forming reactions. The metal salt is dissolved in a liquid plasticizer, and the liquid plasticizer is blended with solid waxes to form a solid, substantially non-toxic, non-hygroscopic, moldable waxy material which is non-softening under normal conditions but which can easily be shaped, hot-melt coated, or the like at temperatures above 60° C. The composition is useful for making wax imaging crayons and sheet-like dispensing means for the metal salt imaging chemical.

6 Claims, No Drawings

IMAGE DEVELOPING MEANS

This is a continuation, of application Ser. No. 207,646 filed Dec. 13, 1971.

FIELD OF THE INVENTION

This invention relates to moldable compositions which can form solid coatings on sheet-like substrates or solid, wax crayon-like members. The compositions of this invention do not necessarily contain any visible coloring matter, but they do provide a means for dispensing a metal salt capable of reacting with a dye precursor such as a polyhydric phenolic material. In accordance with conventional imaging chemistry, the metal salt and dye precursor combine to form a colored chemical complex. Thus, this invention is particularly suited for providing a means for developing latent or hidden entries, invisible ink deposits, or the like, where the entries or deposits contain the dye precursor. An aspect of this invention relates to the combination of a liquid plasticizer phase with a solid wax phase, wherein the liquid plasticizer phase contains a metal (preferably iron) salt dissolved therein and the solid wax phase is capable of homogeneously blending with or taking up the liquid plasticizer phase to yield a waxy material solid under normal ambient conditions and not softened by moderate heat, sunlight, or high humidity.

DESCRIPTION OF THE PRIOR ART

Since the development of the art of "paper-based feedback systems" in the field of education, various means for printing and developing latent images have been extensively investigated. See "Feedback Systems for Use With Paper-Based Instructional Products", a report of the Southwest Regional Laboratory for Educational Research and Development, Joel Strandberg, dated Feb. 14, 1969; see also U.S. Pat. Nos. 3,363,337 (Skinner et al), issued Jan. 16, 1968, 3,451,143 (Thomas et al), issued June 24, 1969, and 3,516,177 (Skinner) issued June 23, 1970. A typical approach used in this art is to print, by some means, an "invisible ink" or latent imaging material onto a test sheet or answer sheet, this latent-imaged sheet being adapted for use with some sort of imaging tool.

One of the imaging tools most recently developed is a wax crayon containing an iron salt. If the "invisible ink" deposits contain a dye precursor reactive with ferric ion, e.g. propyl gallate, the tip of the crayon can simply be rubbed onto the latent print area or invisible ink deposit to develop the latent image and reveal some pertinent information relating to an examination question or the like. The basic principle involved in such an imaging step is the physical transfer, through friction, of a metal salt coreactant to the site of the dye precursor deposits.

This principle of frictional transfer of the coreactant salt has been used for many years outside the field of latent image development. For example, U.S. Pat. No. 2,168,098 to J. Groak, issued Aug. 1, 1939, discloses a transfer sheet coated with an iron salt and mixed with a wax, a starch binder, and other materials for facilitating an image-forming reaction. The transfer sheet described by Groak can be used to transfer small amounts of the iron salt to a receptor sheet containing a dye precursor such as gallic acid.

There are several potential advantages when the imaging tool used to develop invisible ink deposits in the various paper-based feedback educational systems comprises a waxy matrix containing a metal salt coreactant. Accordingly, the development of an iron salt-containing wax crayon appeared at first to be a useful step forward in the art. These crayons could not possibly lead or run dry, unlike any liquid dispensing means such as a felt-tipped pen. The crayons appeared to be well suited for mailing or shipping along with paper-based educational systems and course materials. The crayons also appeared to be as simple to use and as easy to care for as conventional wax coloring crayons.

In actual practice, however, the prior art wax imaging crayons proved to be much more difficult to use and care for than originally anticipated. The prior art imaging crayons have a tendency to undergo undesirable changes during storage. One of the most serious of these changes during storage is the formation of an unreactive skin at the outer surface of the crayon. Apparently, aging under ambient conditions renders the outer surface of the waxy crayon composition non-reactive. It is actually necessary to remove this outer layer or skin before the prior art crayon becomes functional.

Improvement upon the performance of prior art imaging crayons is not straightforward. The crayon forming composition can be made more reactive by adding reaction-facilitating chemicals to the wax matrix, but the hardness or durability of the crayon may have to be sacrificed. It has been found, for example, that some waxy compositions are sensitive to air, humidity, sunlight, or very moderately elevated ambient temperatures. On the other hand, the dimensional stability and hardness of the crayon should not be obtained at the sacrifice of imaging speed.

BRIEF DESCRIPTION OF THE INVENTION

The moldable compositions of this invention are provided by dissolving a coreactant metal salt, preferably a ferric salt of an aromatic carboxylic acid, with an oily liquid plasticizer capable of forming the true solution containing at least about 0.25% by weight of element iron (as ferric ion), and intimately blending this plasticizer phase containing at least 0.25% or some higher level of ferric ion (up to the level of saturation) with an oil-absorptive blend of waxes and resin which is solid at room temperature and at moderately elevated ambient temperatures, e.g. up to at least 50° C. The resulting plasticizer/wax blend is apparently a solid waxy material with microscopic droplets of plasticizer dispersed therethrough.

Though less preferred, it is permissible to substitute other coreactant metal salts for $Fe(OCOAr)_3$, e.g. ferric rosinate or salts of nickel, copper, cadmium, or cobalt. The preferred salt is ferric benzoate, since this salt is soluble in concentration of up to approximately 20% by weight in oily liquid plasticizers comprising one or more low toxicity, low volatility, image accelerating compounds such as tributyl phosphate, tributoxyethyl phosphate, polyoxyethylene aryl ethers, and dimethyl phthalate. It is essential that the wax blended with the plasticizer phase be capable of retaining a high level of oily liquid plasticizer, preferably 2 - 35% by weight, without substantial loss of the necessary properties of a good crayon material. That is, the material resulting from the blend of the wax and the plasticizer phases should have a softening point in excess of 50° C., preferably in excess of 65° C.; a melting point higher than the softening point, but well within the temperature ranges used in processing the compositions of this invention, e.g. temperatures below 200° C.; resistance to degradation or softening by humidity or sunlight; and sufficient strength, at normal ambient temperatures, to permit handling during wrapping, packaging, and end use. The preferred wax blend comprises a paraffin wax with some microcrystalline characteristics, a microcrystalline wax, and a minor amount of a compatible resin which permits the use of lower temperatures during molding steps and the use of lower molecular weight waxes without noticeable loss of strength at room temperature. An example of suitable resin is vinyl acetate resin.

The resins and waxes should be compatible with each other and the resin-wax blend should have the ability to take up, entrap, or otherwise intimately blend with the plasticizer phase. Two components are considered compatible if they can be combined to form a homogeneous liquid phase when at least one of the compounds is in a liquid state. The total plasticizer/wax blend may be a two-phase system, as pointed out previously.

It is preferred that compatibility and ease of blending should be maintained for the various components of this invention throughout the range of about 27° to about 115° C., and preferably up to the temperatures at which the composition is blended and processed and shaped into crayons or hot-melt coated. Typically, processing temperatures are above 60° C., but not significantly above 150° C.

DETAILED DESCRIPTION AND EXAMPLES

The compositions useful for making wax imaging crayons, melt-coated coreactant transfer sheets, and other imaging tools will now be described in detail.

All the compositions of this invention contain one or more metal salts capable of reacting with dye precursors. To react with a dye precursor, it is necessary that the stability constant of the metal salt be less than that of the metal/dye precursor complex. By "dye precursor" is meant a compound such as dithiooxamide, which reacts with salts of nickel, copper, cadmium, or cobalt; or, preferably, a polyhydric phenol, i.e. a polyhydroxy aromatic compound capable of complexing ferric ion. Commonly used polyhydric phenolic iron-complexing compounds include gallic acid, the gallates (particularly the lower alkyl gallates such as methyl and propyl gallate), catechol, pyrogallol, lauroyl pyrogallol, and similar ortho-dihydroxy or trihydroxy-benzene or -benzoic acid or -benzoic acid ester compounds.

The preferred metal salts of this invention are iron (III) salts which are compatible in significant concentrations with oily liquid ester- or ether-type plasticizers. By "significant concentrations" is meant at least 6 wt. % and preferably at least 10 wt. %. Iron (III) salts of organic carboxylic acids, e.g. ferric acetate, ferric octoate, ferric rosinate, ferric stearate, ferric oleate, and ferric oxalate are compatible to some extent with one or more plasticizers (generally at levels below 10 wt. %), but only the iron (III) salts of the aromatic carboxylic acids, e.g. ferric benzoate, appear to provide both high compatibility and good imaging speed when used in a wax crayon. The reasons for the superior performance of ferric benzoate are not altogether clear. It appears that the wax crayon or imaging tool should be more than just a matrix for retaining the iron salt. Good imaging speed is apparently not obtained unless the iron salt is present in the imaging composition as a solute stably dissolved in a solid phase or, preferably, in a liquid uniformly dispersed throughout a solid phase. Optimum iron salt solubility appears to be obtained with the iron (III) salts of aromatic carboxylic acids, i.e. acids of the formula $Ar(COOH)_n$, where $n$ is a small whole number, preferably 1, Ar is a polycyclic or, preferably, monocyclic aromatic nucleus, and Ar and $n$ are selected such that the stability constant of the resulting ferric salt is less than that of an iron/polyhydric phenol complex. Compounds of the formula $Fe(OCOAr)_3$ appear to dissolve readily in a variety of oily liquid ester- or ether-type plasticizers, which plasticizers can in turn be easily blended with solid waxes. For example, a liquid plasticizer comprising a mixture of tributoxyethyl phosphate and a polyoxyethylene aryl ether can dissolve up to about 20% by weight of ferric benzoate with only a negligible loss of the homogeneity of the liquid phase due to precipitation of the solute and/or minor amounts of insoluble by-products. The resulting plasticizer phase blends intimately with hydrocarbon waxes without unduly softening the total composition.

According to the requirements of this invention, elemental iron (as ferric ion) should preferably comprise at least about 0.1% by weight of the total imaging composition (including waxes, plasticizers, etc.). When this amount of iron (ferric ion) is less than 0.10 wt. %, the imaging or developing capability of the crayon or other imaging tool is inadequate. Excellent imaging capability is observed in the range of 0.1 - 0.8 wt. % and very little, if any, improvement in speed or quality of imaging is obtained by increasing the iron content beyond 1.0 wt. %. The optimum iron content is determined by the iron salt content which in turn is most conveniently determined by (a) the plasticizer content of the complete formulation (a compatible blend of waxes, plasticizers, etc.), and (b) the concentration of a saturated solution of the iron salt in the plasticizer. An excess of iron salt over this saturation level is operative but does not further optimize the system. Saturated solutions containing about 20 wt. % or more of iron salt are possible. Since the plasticizer content generally does not exceed 35 wt. % of the total formulation, even the highest practical solute saturation levels in the plasticizer phase are likely to provide less than 10 wt. % iron salt content in the total formulation. But 5 wt. % or more of iron salt provides ample iron content. When the iron salt has a relatively low molecular weight anion and/or is derived from a polycarboxylic acid, the iron content for 5 wt. % iron salt can easily exceed the optimum iron content range of 0.1 - 0.8 wt. %. For 5 wt. % ferric benzoate, the iron content will be almost 0.7% — near the top of the optimum range.

When the crayon or other imaging tool is rubbed on the latent print entry to be developed, the predissolved iron or other metal salt is apparently liberated in solution form, providing a highly efficient medium for formation of the metal/dye precursor complex.

The oily liquid plasticizers used as solvents for the iron (III) salt are preferably low toxicity or non-toxic esters or ethers. These oily liquids should have very low volatility at room temperature and at temperatures in the 60 - 200° C. range, so that the solvent for the iron salt will not be driven off during manufacture of the crayons or hot melt coating of sheet-like strips or any other operation for shaping the imaging compositions of this invention. For example, a vapor pressure, at 150° C. and one atmosphere, of more than 100 mm. of mercury could be detrimental to the objects of this invention (due to evaporation during processing and at room temperature after processing), while a vapor pressure less than 15 mm. under these same conditions would have little, if any, adverse effect. The preferred oily liquid esters are tri-lower alkyl phosphates or tri-lower alkoxyalkyl phosphates or di-lower alkyl esters of dicarboxylic acids. The term lower alkyl is used herein to denote the $C_1$ to $C_6$ alkyls. Suitable examples include triethyl phosphate, tributyl phosphate, tributoxyethyl phosphate, dimethyl phthalate, diethylphthalate, dibutylphthalate, and mixtures thereof. Suitable oily liquid ethers include polyoxyethylene aryl ethers and other ethers capable of dissolving significant amounts of ferric benzoate. These compounds are, at worst, only slightly toxic to humans; each is reasonably safe to use, at least at ambient temperatures. Furthermore, these compounds are substantially non-hygroscopic. A particularly useful plasticizer blend comprises 40–60 wt. % of the ether and 60–40 wt. % of tributoxyethyl phosphate or other phosphate ester. The oily liquid should be compatible with both the ferric or other metal salt and be readily taken up by the wax components. To be effective, the oily liquid should be blended with the iron salt prior to blending with the waxy materials; pre-blended with the salt in this manner, the oily liquid prevents the iron salt from behaving as a dispersed particulate solid and keeps the iron salt within the plasticizer phase. It is not known whether or not the plasticizer forms a single phase with the wax or waxes at elevated temperatures, and, in any event, this invention is not bound by such theoretical considerations. What does appear to happen is that the plasticizer phase, with its iron salt solute, continues to exist as a liquid after cooling of the total blend to room temperature. Evidence for this proposition is as follows:

The plasticizer or solvent is preferably inert toward iron salts, but has an accelerating effect upon the imaging-forming reaction. One test for the inadequacy of the amount of plasticizer phase in the total formulation is a marked decline in imaging speed. Another test for the inadequacy of the plasticizer or solvent level is the lack of homogeniety of the total imaging composition. When the plasticizer level is adequate, electron photomicrographs of the total composition show a substantially homogeneous solid phase and a substantially uniform distribution of microscopic pockets (possibly containing trapped liquid) throughout the solid phase.

To provide at least 0.1% by weight of elemental iron in the total composition, more than 2% by weight of the total imaging composition should be plasticizer or solvent, preferably more than about 5 wt. %. The plasticizer content is excessive if resolution of the iron/-polyhydric phenol image is lost due to changes in the appearance to the background area around the image or if the crayon or coating composition becomes excessively soft at room temperature. In any event, there appears to be no particular advantage in increasing the amount of plasticizer phase in the total composition beyond about 35 wt. %. The optimum upper limit is about 25 wt. %. Accordingly, to provide the 0.1 wt. % elemental iron level in the total composition, the elemental iron content of the plasticizer phase would have to be at least 0.28 wt. %, preferably at least 0.4 wt. %.

In addition to the plasticizer or solvent phase, described previously, the compositions of this invention contain a waxy, solid phase comprising hydrocarbon waxes having molecular weights of at least 300, densities in the range of about 0.9 to about 1.05 and melting points in the range of 50° to about 95° C. This waxy phase should in any event be liquefiable or at least softenable at normal ambient pressures and at ambient temperatures of less than 200° C., preferably less than 115° C. The waxes useful for providing this phase preferably have some microcrystalline and some paraffin character. Suitable waxes are available from Shell Chemical Company under the trade designations "Shellwax" and "Shellmax". These and other suitable waxes have low or negligible toxicity and suitable viscosities in a liquid or semi-liquid state, i.e. viscosities which permit shaping operations such as casting, hot melt coating, and extruding. Other desirable features of the preferred waxes are their large capacity for absorbing oily liquids (such as the plasticizer phase) and their physical strength characteristics, which permit a considerable amount of handling of the composition after molding and cooling.

It is preferred to add toughening agents such as synthetic organic resins to the waxy phase. Vinyl resins, e.g. polyvinyl acetate, are particularly useful for this purpose. Suitable vinyl toughening agents are available under the trademark "Elvax" from the duPont Company. The "Elvax" vinyl resins are amorphous, wax-compatible polymers having specific gravities near 0.95 and viscosities (at 30° C., 0.25% in toluene) of 0.77 – 0.85 centipoise. These polymers are generally insoluble in polar solvents and have an extensibility at break of 700%. It is preferred to add about 0.1 – 10 wt. % of a toughening agent.

Antioxidants and other stabilizers can also be added to the waxy phase, if desired. Some suitable commercial waxes and resins are already provided with stabilizing additives.

The total wax phase, including additives (toughening agent, antioxidants, etc.) will provide a crayon or other imaging tool with good physical properties if this phase comprises at least about 65 wt. % of the total formulation, but at concentrations higher than 98 wt. % or even 95 wt. %, considerable imaging speed will be lost and additional plasticizer phase (containing a dissolved co-reactant salt) will ordinarily have to be added. The major amount of the wax phase is preferably microcrystalline in nature, a substantial minor amount being more or less paraffinic in nature. Based on the total composition, the microcrystalline wax should comprise about 30 – 55 wt. % of the composition; about 10 – 50 wt. % of the composition can be one or more waxes with at least some paraffinic character.

In the preferred method for preparing the compositions of this invention, the wax or wax-resin phase (including antioxidants or other additives) and the plasticizer or solvent phase (including dissolved metal salt) are first made up separately. The waxy and resinous materials can be blended together in a molten state at 100 – 150° C., preferably about 115° C. The solvent and metal salt (e.g. ferric benzoate) can be blended together at normal ambient temperatures. The metal salt solution is then added, with stirring, to the molten wax-resin phase. The resulting composition can be cooled to a solid material which melts substantially at the temperature of the highest melting wax component, e.g. 80 – 90° C., but which has a broad softening range below the melting point, e.g. a softening range extending down to 65° C., but preferably not below 50° C. The composition has excellent shelf life and aging stability and can be cast or extruded into rod-like shapes suitable as wax crayons, or hot-melt coated onto paper, polymeric film, or other flexible, sheet-like substrates. The resulting imaging tool, containing a suitable salt of iron, nickel, etc. can be used to develop latent images comprising a gallate, dithiooxamide (or derivative thereof), pyrogallol, catechol, and the like. Suitable metal salts (which are preferably iron salts) exhibit a stability constant, expressed as $\log_{10} K$ of the K measured in an aqueous medium, of less than 8, preferably less than 6. For a discussion of stability constant data, see Graddon, *Introduction to Coordination Chemistry*, Second Ed., Pergamon Press, 1968.

The following non-limiting Example illustrates the invention.

EXAMPLE

A part A (plasticizer phase) was prepared from the following components:

| Part A | Parts by Weight |
| --- | --- |
| "Pycal 94" (trade designation for polyoxyethylene aryl ether obtainable from Atlas Chemical Industries) | 10 |
| Tributoxyethyl phosphate | 10 |
| Ferric benzoate | 5 |

The "Pycal 94" and tributoxyethyl phosphate were blended together to form a homogeneous non-volatile oily liquid. The ferric benzoate was added to this oily liquid and stirred until dissolved. The resulting clear liquid was apparently a true solution of the ferric benzoate containing a small amount of insoluble precipitate.

The following components were blended together to form a wax-resin phase:

| Part B | Parts by Weight |
| --- | --- |
| "Shellmax" 500 (trademark for a microcrystalline wax available from Shell Chemical Company having a melting point of 138° F. and a specific gravity of 0.93) | 40 |
| "Shell XPW 1333" (trade designation of Shell Chemical Company for paraffin wax-resin blend containing anti-oxidant) | 29 |
| "Shellwax" 700 (trademark of Shell Chemical Company for a wax with the characteristics of both paraffin and microcrystalline waxes; Melting point: 181° F., Specific gravity: 0.94) | 5 |
| "Elvax" Grade 40 (vinyl acetate resin, a wax toughening agent available from the duPont Company) | 1 |

The components of Part B were melted and blended together at 240° F. (115° C.) with agitation.

A moldable composition was obtained by adding Part A to Part B, with agitation, while Part B was still in the molten state. When cooled to room temperature, a solid mass was obtained with properties very similar to those of waxes used to make conventional wax crayons. It was found that rods 1.2 cm. in diameter could be cast from the composition obtained by combining Parts A and B. These rod-like shapes were useful as imaging crayons. The crayons had excellent resistance to undesirable changes upon exposure to sunlight, humidity, and aging.

What is claimed is:

1. A composition molded into an imaging means, said composition comprising
  (1) 5 – 25% by weight of an oily liquid solvent phase comprising a liquid polyoxyalkylene aryl ether blended with a liquid organic phosphate ester, said solvent phase containing ferric benzoate dissolved therein,
  (2) at least 65% by weight of a wax blend, said blend comprising a major amount of microcrystalline wax and a substantial minor amount of a wax with some paraffin character,
  (3) 0.1 – 10% by weight of a wax-compatible, amorphous vinyl resin wax toughening agent, said toughening agent being intimately blended with said wax blend, said wax blend being intimately blended with said oily liquid solvent phase, and said ferric benzoate being present in sufficient quantity to provide from about 0.1 to about 1% by weight of elemental iron, as ferric ion, in said composition.

2. A composition molded into an imaging means comprising
  (a) at least about 2% by weight of an oily organic liquid solvent phase selected from the group consisting of esters, ethers, and mixtures thereof, said solvent phase having dissolved therein an iron (III) salt of an organic carboxylic acid which is reactive with a dye precursor to form a stable, colored complex, said salt being present in an amount to provide at least about 0.1% by weight of metal ion in said composition, and
  (b) about 65 to about 98% by weight of a waxy solid material having a melting point of at least about 50° C., said waxy solid material being intimately blended with said solution of said metal salt, said composition being solid at temperatures up to at least about 50° C.

3. A composition according to claim 2 wherein said iron salt is selected from the group consisting of ferric benzoate, ferric octoate, ferric rosinate, ferric stearate, ferric oleate, ferric oxalate, and mixtures thereof.

4. A composition according to claim 2 wherein said organic carboxylic acid is an aromatic carboxylic acid and wherein said iron (III) salt has a stability constant, expressed as $\log_{10} K$ of the K, measured in an aqueous medium, of less than 8.

5. A composition molded into an imaging means comprising
  (a) at least about 2% by weight of an oily organic liquid solvent phase selected from the group consisting of esters, ethers, and mixtures thereof, wherein said oily liquid ester is selected from the group consisting of triethyl phosphate, tributyl phosphate, tributoxyethyl phosphate, dimethyl phthalate, diethyl phthalate, dibutyl phthalate, and mixtures thereof, said solvent phase having dissolved therein a metal salt which is reactive with a dye precursor to form a stable, colored complex, said salt being present in an amount to provide at least about 0.1% by weight of metal ion in said composition, and
  (b) about 65 to about 98% by weight of a waxy solid material having a melting point of at least about 50° C., said waxy solid material being intimately blended with said solution of said metal salt, said composition being solid at temperatures up to at least about 50° C.

6. A composition according to claim 5 wherein said ether is polyoxyethylene aryl ether.

* * * * *